United States Patent Office 2,706,158
Patented Apr. 12, 1955

2,706,158
STABILIZED EDIBLE FATS AND OILS

Norman E. Searle, Crestfield, near Wilmington, Del., assignor to E. I. du Pont de Nemours and Company, Wilmington, Del., a corporation of Delaware No Drawing. Application July 20, 1953,
Serial No. 369,239

8 Claims. (Cl. 99—163)

This invention is concerned with new compositions of matter, and, more particularly, with edible compositions characterized by excellent resistance to the development of rancidity during storage.

The problems of food preservation are older than recorded history. Except for a very few areas of natural paradise, most of the earth is inhabited by people for whom the achievement of a steady supply of food is intimately linked with their ability to preserve food from a time of ample supply into periods when the supply is inadequate. Thus, it has long been commonplace for men to be on the lookout for new ways to preserve food. The use of chemical additives for food preservation has been intensively examined and an extensive art has been developed. However, many proposed chemical food preservatives have been unsatisfactory because of producing an undesirable taste in the food. Still more have been unsatisfactory because they are themselves not safe for consumption.

This invention has as an object the provision of edible fats and oils of improved stability. A further object is the stabilization of these fatty glycerides against rancidification. Another object is alimentary compositions in major proportion, an edible fat or oil, and in minor proportion, a stabilizer therefor. Other objects will appear hereinafter.

These objects are accomplished by the present invention of edible fatty glycerides containing an organic compound of molecular weight not exceeding 500 and of the formula R—R'—COR", wherein R is

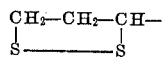

or

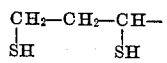

or C-alkyl derivatives thereof in which the alkyl groups contain not more than four carbon atoms, R' is a divalent hydrocarbon radical of up to eight carbon atoms and R" is —OH or a group hydrolyzable thereto. These fatty glyceride compositions are remarkably stable against development of rancidity. Only a small amount of the compound of the above formula need be added to produce an improvement in the stability of the glyceride. In general, the amount used will not be less than 0.001% and will generally be above 0.01%. Large amounts, e. g., 50% or even higher, may be added for use as such or for subsequent dilution.

In a preferred embodiment of this invention an edible grade of oil or fat such as corn oil or lard is stabilized by the addition of a minor proportion of 5-(1,2-dithiolane-3-yl)pentanoic acid. The stabilized oil shows no evidence of rancidity after several months at room temperature, whereas the unstabilized controls rapidly become rancid.

The stabilizers used in the practice of this invention may be prepared by the methods of copending applications Ser. No. 325,236, filed December 10, 1952, by Donald S. Acker and Charles W. Todd, Ser. No. 325,237, filed December 10, 1952, by Donald S. Acker.

The following examples in which parts are by weight are illustrative of the invention.

EXAMPLE I

A 50% solution in benzene of a commercially available edible corn oil (solution A) was divided into equal parts. To one part was added 1% of 5-(1,2-dithiolane-3-yl)pentanoic acid based on the weight of the corn oil. A clear solution was obtained by gentle stirring (solution B). Separate pieces of filter paper were dipped respectively in solution A and solution B. The wet papers were blotted to remove excess solution and dried in nitrogen until all the benzene had evaporated. The weight of oil on the paper coated from solution A was 0.2525 g. and on the paper coated from solution B was 0.2702 g. The impregnated papers were placed in separate micromanometric Warburg respirometers and the oxygen absorption was determined at 25° C. by the customary method for this apparatus (see Umbriet, W. W.; Burris, R. H.; Stauffer, J. F., "Manometric Techniques and Tissue Metabolism" (Burgess Publishing Co., Minneapolis, 1951) pp. 1 et seq.). The results are shown in Table I.

Table I

| Coating on Paper | Coated from Solution— | Oxygen Absorbed (mm.³) | | | |
|---|---|---|---|---|---|
| | | 8 hr. | 24 hr. | 48 hr. | 120 hr. |
| Corn Oil (control) | A | 5 | 16 | 30 | 73 |
| Corn oil+1% 5-(1,2-dithiolane-3-yl)pentanoic acid | B | 0 | 3 | 5 | 13 |

In spite of the fact that the sample of oil from solution B was slightly larger, it showed a very substantially reduced rate of oxygen absorption. The absorption of oxygen by the stabilized sample was so low as clearly to indicate, to those skilled in the art, substantially complete inhibition of the autooxidation of the oil.

EXAMPLE II

A sample of solution A (Example I) was stabilized by the addition of 0.1% of 5-(1,2-dithiolane-3-yl)pentanoic acid by weight based on the corn oil (solution C). Filter papers soaked in soultions A, B, and C were freed of benzene by drying under nitrogen. Samples of the coated papers were placed in separate closed glass bottles in the presence of air and were examined daily for the development of rancidity during exposure to the conditions noted in Table II. The times for the initial detection of a slight odor of rancidity and for the development of a strong odor of rancidity were noted for each sample.

Table II

| Coating on Paper | Coated from Solution— | Days Required for Rancidity to Develop | | | |
|---|---|---|---|---|---|
| | | At Room Temperature | | At 65° C. | |
| | | Initial Detection of Slight Rancidity | Strong Rancidity | Initial Detection of Slight Rancidity | Strong Rancidity |
| Corn oil (control) | A | 10 | 30 | 2 | 3 |
| Corn oil+1% 5-(1,2-dithiolane-3-yl)pentanoic acid | B | (¹) | (¹) | 12 | 13 |
| Corn oil+0.1% 5-(1,2-dithiolane-3-yl)pentanoic acid | C | (²) | (²) | 4 | 5 |

¹ No rancid odor after 80 days.
² No rancid odor after 68 days.

This illustrates the very substantial increase in resistance to the development of rancidity which is imparted to edible corn oil by the addition of the stabilizers of the present invention in amounts as small as 0.1% of the weight of the oil to be stabilized. Amounts as small as 0.01% based on the edible oil definitely increase the resistance to rancidity developement at room temperature or thereabouts but are not as effective at higher temperatures of the order of 65° C. When in place of the 5-(1,2-dithiolane-3-yl)pentanoic acid, there is employed the amide, anilide, or an ester of said acid, inhibition of rancidification is observed but not to the extent observed with the free acid.

EXAMPLE III

A 50% solution of lard in benzene (solution D) was divided into three portions. One portion was kept as a control and the others were stabilized by the addition of 5-(1,2-dithiolane-3-yl)pentanoic acid as follows:

Solution E—1% 5-(1,2-dithiolane-3-yl)pentanoic acid based on weight of lard
Solution F—0.1% 5-(1,2-dithiolane-3-yl)pentanoic acid based on weight of lard Papers were coated with solutions D, E, and F and the benzene removed under nitrogen as in Example I. The papers were placed in separate closed glass bottles and examined for the development of rancidity as in Example II. The results are shown in Table III. When in place of the 5-(1,2-dithiolane-3-yl)pentanoic acid, there is employed the amide, anilide, or an ester of said acid, inhibition of rancidification is observed but not to the highly superior extent observed when the free acid was used. In view of the widespread use of lard in deep fat frying the inhibition of high temperature rancidity development in lard is particularly noteworthy.

Table III

| Coating on Paper | Coated from Solution— | Days Required for Rancidity to Develop | | | |
|---|---|---|---|---|---|
| | | At Room Temperature | | At 65° C. | |
| | | Initial Detection of Slight Rancidity | Strong Rancidity | Initial Detection of Slight Rancidity | Strong Rancidity |
| Lard (control) | D | 60 | 74 | | 5 |
| Lard+1% 5-(1,2-dithiolane-3-yl)pentanoic acid | E | (1) | (1) | (2) | (2) |
| Lard+0.1% 5-(1,2-dithiolane-3-yl)pentanoic acid) | F | | | 9 | 10 |

1 No rancid odor after 102 days.
2 No rancid odor after 44 days.

EXAMPLE IV

Fresh creamery butter was melted on a steam bath and divided into two parts. One part was used as a control (sample G) and into the other part was dissolved 0.1% by weight of 5-(1,2-dithiolane-3-yl)-pentanoic acid (sample H). Filter papers were impregnated from the two melts and placed in separate closed glass bottles to be examined for the development of rancidity at 65° C. as in Example II. The results are shown in Table IV.

Table IV

| Coating on Paper | Days Required for Rancidity to Develop at 65° C. | |
|---|---|---|
| | Initial Detection of Slight Rancidity | Strong Rancidity |
| Sample G (no stabilizer) | 4 | 5 |
| Sample H (stabilized) | 9 | 10 |

In room temperature tests, sample G had a more disagreeable odor than sample H after 72 days.

EXAMPLE V

A portion of solution A from Example I was stabilized by dissolving in it 1% of 6,8-dimercaptooctanoic acid based on the weight of corn oil present (solution J). Filter papers soaked in solutions A and J were freed of benzene by drying under nitrogen and placed in separate closed glass bottles and examined for the development of rancidity as in Example II. The results are shown in Table V.

Table V

| Coating on Paper | Coated from Solution— | Days Required for Strong Rancidity to Develop at 65° C. |
|---|---|---|
| Corn oil (control) | A | 3. |
| Corn oil + 1% 6,8-dimercaptooctanoic acid. | J | (no rancid odor after 40 days). |

EXAMPLE VI

A portion of solution D from Example III was divided into two parts. To one was added 1% (by weight of the lard present) of 6,8-dimercaptooctanoic acid (solution K). To the other was added 0.1% (by weight of lard present) of 6,8-dimercaptooctanoic acid (solution L). Filter papers soaked in solutions D, K, and L were freed of benzene by drying under nitrogen, placed in separate closed glass bottles and examined for the development of rancidity as in Example II. The results are shown in Table VI.

Table VI

| Coating on Paper | Coated from Solution— | Days Required for Strong Rancidity to Develop at 65° C. |
|---|---|---|
| Lard (control) | D | 5. |
| Lard + 1% 6,8-dimercaptooctanoic acid | K | (no rancid odor after 34 days) |
| Lard + 0.1% 6,8-dimercaptooctanoic acid. | L | Do. |

EXAMPLE VII

Ethyl $\Delta^7$, 6-ketononenoate, prepared by the method of Bullock et al., J. Am. Chem. Soc. 74, 3455 (1952) by condensing ethyl adipyl chloride and propylene, was converted to 5-(5-methyl-1,2-dithiolane-3-yl)pentanoic acid by the process of Example I of copending application Ser. No. 325,236, filed December 10, 1952, by Donald S. Acker and Charles W. Todd.

A commercially available edible corn oil (a different lot from that used in Example I) was dissolved in benzene to give a 50% solution (solution M). To a part of this solution was added an amount of 5-(5-methyl-1,2-dithiolane-3-yl)pentanoic acid sufficient to give 1% of this acid by weight of the corn oil present (solution N). Filter papers soaked in solutions M and N were freed of benzene by drying under nitrogen and placed in separate closed glass bottles and examined for the development of rancidity as in Example II. The results are shown in Table VII.

Table VII

| Coating on Paper | Coated from Solution— | Days Required for Strong Rancidity to Develop at 65° C. |
|---|---|---|
| Corn oil (control) | M | 7. |
| Corn oil + 1% 5-(5-methyl-1,2-dithiolane-3-yl)pentanoic acid. | N | (no rancid odor after 22 days). |

EXAMPLE VIII

A sample of solution D (Example III) was stabilized by addition of 1%, by weight of the lard present, of 5-(5-methyl-1,2-dithiolane-3-yl)pentanoic acid, the preparation of which is shown in Example VII. This stabilized solution was designated solution O. Filter papers soaked in solutions D and O were freed of benzene by drying under nitrogen and placed in separate closed glass bottles and examined for the development of rancidity as in Example II. The results are shown in Table VIII.

Table VIII

| Coating on Paper | Coated from Solution— | Days Required for Strong Rancidity to Develop at 65° C. |
|---|---|---|
| Lard (control) | D | 5. |
| Lard + 1% 5-(5-methyl-1,2-dithiolane-3-yl)pentanoic acid. | O | (no rancid odor after 25 days). |

The edible fats and oils stabilized according to this invention are usually naturally occurring glycerides of the longer chain fatty acids which normally develop a rancid odor and/or taste after storage for some time at ordinary temperatures. This rancidity is commonly supposed to be caused by oxidation of unsaturated fatty acid glycerides in the fat or oil in question. Pure "olein" (i. e., glyceryltrioleate) would be an example of an edible oil subject to rancidity development, while pure stearin (glyceryl tristearate) would not be expected to become rancid. However, naturally occurring oils and fats are usually mixtures of saturated and unsaturated glycerides. There are also glycerides in which the glycerol molecule is esterified partly with an unsaturated acid such as oleic or linoleic, partly with a saturated acid such as stearic. There are, furthermore, hydrogenated oils and fats which still contain sufficient unsaturation to become rancid under proper conditions. All of these oils and fats are within the scope of this invention. By "longer chain fatty acid" is meant an acid of at least 12 carbon atoms of the type which is usually found in naturally occurring fats and oils. Examples of such fats and oils are animal fats such as lard, butter, edible tallow, fish liver oil, fish oils, and whale oil; vegetable fats and oils such as coconut oil, palm oil, soybean oil, cocoa butter, olive oil, cottonseed oil, peanut oil, sunflower seed oil, castor oil, and partly hydrogenated oils of these kinds.

The compounds which function as stabilizers for fatty acid glycerides according to the present invention are substituted dithiolanes in which one of the substituents carries a carboxyl group, and the corresponding reduced forms in which the dithiolane ring is opened to give a dimercaptan. The present invention is generic to edible fatty glyceride compositions containing, in major proportion, an edible fatty glyceride subject to rancidity development on exposure to air and, in minor proportion, but at least 0.001% based on the glyceride, of

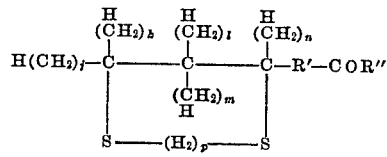

wherein $j$, $k$, $l$, $m$, and $n$ are cardinal numbers not greater than 4, $p$ is a cardinal number not greater than 1, $R'$ is a hydrocarbon radical of not more than eight carbons—preferably $C_rH_{2r}H$ wherein $r$ is a cardinal number not greater than 8 and $R''$ is hydroxyl or a group hydrolyzable thereto. The carboxyl group may be in the form of the free acid, an ester or an amide. The invention is thus generic to the use of the dithio compounds above defined, including those of the following table:

Table IX

| Dithiolanes | Dimercaptans |
|---|---|
| 5-(5-methyl-1,2-dithiolane-3-yl)pentanoic acid | 6,8-dimercaptononanoic acid |
| Ethyl-1,2-dithiolane-3-yl-formate | Ethyl-2,4-dimercaptobutyrate |
| 4-tert.butyl-5(1,2-dithiolane-3-yl)pentanonamide | 4-tert.butyl-6,8-dimercaptooctanoamide |
| 2-(1,2-dithiolane-3-yl)acetic acid | 3,5-dimercaptopentanoic acid |
| 3-(1,2-dithiolane-3-yl)propionic acid | 4,6-dimercaptohexanoic acid |
| 6-(1,2-dithiolane-3-yl)hexanoic acid | 7,9-dimercaptononanoic acid |
| 9-(1,2-dithiolane-3-yl)nonanoic acid | 10,12-dimercaptododecanoic acid |
| 4-methyl-4-ethyl-4-(1,2-dithiolane-3-yl)butyric acid | 4-methyl-4-ethyl-5,7-dimercaptoheptanoic acid |

The stabilized fat and oil compositions of this invention are particularly useful for deep fat frying of foods such as doughnuts, potato chips, "French fries," onions, meat, fowl, and sea food. In such uses the benefit of resistance of rancidification is shared both by the fried food and the frying bath. The latter can be reused repeatedly. After extended use of the frying bath at high temperature, the stability of the oil may be renewed by the addition of fresh stabilizer.

In the stabilized compositions of the present invention the dithiolane- and dimercaptocarboxylic acids and their derivatives are synthetic organic chemicals, added as such, and not in a form in which they are chemically combined with any moiety of the edible oil or fat being stabilized. As normally prepared these stabilizers are characterized by the absence of optical activity in that they are the racemic forms (DL mixtures). It has been found that the free acids are markedly superior to their derivatives in inhibiting rancidification and for this reason are preferred.

The foregoing detailed description has been given for clearness of understanding only and no unnecessary limitations are to be understood therefrom. The invention is not limited to the exact details shown and described for obvious modifications will occur to those skilled in the art.

What is claimed is:

1. An edible fat or oil, subject to rancidity development having, as a preservative therefor, an organic compound of molecular weight not more than 500 and of the formula R—R'—COR" wherein R is a monovalent radical of the class consisting of

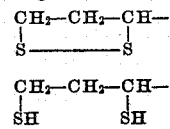

and the C-alkyl derivatives of these radicals wherein the alkyl groups are of up to four carbons, R' is a divalent hydrocarbon radical of not more than 8 carbon atoms and COR" is selected from the class consisting of carboxyl and groups hydrolyzable thereto.

2. Fats and oils having dissolved therein as an inhibitor of rancidification an organic compound of molecular weight not exceeding 500 and of the formula R—R'—COR" wherein R is a monovalent organic radical of the class consisting of

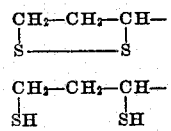

and the C-alkyl derivatives of these radicals wherein the alkyl groups are of up to four carbon atoms, R' is a divalent hydrocarbon radical, and COR" is carboxyl or a group hydrolyzable thereto.

3. A fatty glyceride of tendency to rancidity but stabilized thereagainst by 5-(1,2-dithiolan-3-yl)pentanoic acid.

4. A fatty glyceride of tendency to rancidity but stabilized thereagainst by 6,8-dimercaptooctanoic acid.

5. An edible glyceride oil of tendency to rancidity but stabilized thereagainst by 5-(1,2-dithiolan-3-yl)pentanoic acid.

6. An edible glyceride oil of tendency to rancidity but stabilized thereagainst by 6,8-dimercaptooctanoic acid.

7. A vegetable oil, stabilized against the development of rancidity, containing 5-(1,2-dithiolan-3-yl)pentanoic acid.

8. A vegetable oil, stabilized against the development of rancidity, containing 6,8-dimercaptooctanoic acid.

No references cited.